United States Patent Office 3,522,346
Patented July 28, 1970

3,522,346
NONTHROMBOGENIC MICROCAPSULES
Thomas M. S. Chang, Montreal, Quebec, Canada, assignor to Research Corporation, New York, N.Y., a non-profit corporation of New York
No Drawing. Filed May 31, 1968, Ser. No. 733,314
Int. Cl. A61k 17/18, 19/00, 23/02
U.S. Cl. 424—35                                             6 Claims

ABSTRACT OF THE DISCLOSURE

Nonthrombogenic microcapsules containing a hydrophilic composition or solid particle encapsulated in macromolecular membranes are produced by incorporating in or on the surface of the macromolecular membranes a quaternary-heparin complex. The quaternary-heparin complex may be incorporated in or on the membranes in the course of formation of the membranes or subsequent to the formation of the membranes. The heparin complex may be formed by reacting heparin with quaternized macromolecules forming the membranes or with quaternized components of the membrane. When placed in a nonthrombogenic extracorporeal shunt chamber, such microcapsules, unlike those not containing the quaternary heparin complex, do not cause clotting or reduce the blood level of erythrocytes, leucocytes or platelets of blood perfusing through these microcapsules.

---

This invention relates to nonthrombogenic microcapsules of controlled permeability and methods of making them.

In recent publications T. M. C. Chang, Science, 146, 524–5 (1964); T. M. S. Chang, F. C. MacIntosh and S. G. Mason, Canadian Journal of Physiology and Pharmacology, 44, 115–128 (1966) and T. M. S. Chang, Trans. Amer. Soc. Artif. Int. Organs, 12, 13–19 (1966) and in application Ser. No. 368,945, filed May 20, 1964, continuation-in-part of application Ser. No. 333,075, filed Dec. 24, 1963, by Chang, MacIntosh and Mason, both now abandoned there are disclosed methods of encapsulating aqueous compositions in membranes of controlled size, thickness and permeability by dispersing droplets of an aqueous composition in an organic liquid medium immiscible therewith and adding to the dispersion thereby produced a component soluble in the organic liquid medium and capable of reacting with a component of the hydrophilic composition to form a macromolecular membrane by interfacial coacervation, polymerization or condensation at the surface of the droplets. Typically a polymer or condensation product or a component thereof is added to the organic liquid and the membrane is formed about the droplets by interaction of the polymer, condensation product or component with a component of the dispersed droplets, which may be a precipitant, a condensation or polymerization catalyst or a component of the eventual condensation product.

The cited articles and patent application proprosed the use of the microcapsules so made to introduce into the blood stream or a body tissue microencapsulated compositions acting to release to the blood at controllable rates oxygen, medicaments, enzymatic substances and the like or retaining within the capsules non-diffusing substances, such as radioactive substances, enzymes (which catalyses substrates in the blood diffusing into the microcapsules), or detoxifying materials (which react with toxic substances in the blood diffusing into the microcapsules). Substances opaque to X-radiation or detoxifying materials which react with toxic substances in the blood serum diffusing into the capsules.

The effective pore size of the encapsulating membrane is a function not only of the membrane composition but also of the thickness of the membrane and is selected in accordance with the intended use of the capsules. By suitable choice of operating conditions pore size may be varied, for example, over a range of 5 A. to 20 A. effective pore radius with membranes ranging from 100 A. to 1000 A. in thickness. Microcapsules having a hexamethylenediaminesebacoyl polyamide condensation product membrane about 200 A. in thickness and an effective pore radius of about 16 A. are penetrated by urea and other metabolites, while retaining urease or detoxicants within the microcapsules. Microcapsules having effective pore sizes of the order of 1 micron are permeable to most of the soluble constituents of human blood but would not be penetrated by platelets or by red or white blood corpuscles. In general capsules in the size range from 1 to 200 microns mean diameter are of particular utility for biological applications.

In the utilization of microcapsules containing enzymes or detoxicants in extracorporeal shunt chambers as has been proposed (T. M. S. Chang, Trans. Amer. Soc. Artif. Internal Organs, 12, 13–19, 1966) has required the use of soluble anticoagulants, such as whole body or regional heparinization with risks of hemorrhage or toxicity of the heparin antagonists. In addition, microcapsules prepared by the standard procedures adversely lowered the leucocytes and platelet levels in the blood. I have found that this difficulty can be eliminated and the microcapsules rendered nonthrombogenic by incorporating heparin in or on the macromolecular membrane in the form of a quaternary-heparin complex.

The principles of the invention are illustrated by the following specific examples:

EXAMPLE 1

A benzalkonium-heparin complex (BHC) is prepared by the dropwise addition, with stirring, of 20 ml. of a 10% benzalkonium chloride solution (made by diluting U.S.P. benzalkonium solution with water) to an equal volume of an aqueous solution of heparin sodium (U.S.P. 8 mg./ml.).

The following treatment removes traces of free benzalkonium which causes lysis of erythrocytes and leucocytes: The BHC precipitate is washed with five times with eight volumes of distilled water, then stirred for one hour with eight volumes of water, allowed to sediment, resuspended in three volumes of heparin sodium solution (8 mg./ml.) and stirred again for one hour. After two further washings with eight volumes of water the BHC is dried in a desiccator at room temperature for 24 hours.

150 mg. of the BHC is then dissolved with vigorous stirring in 25 ml. of an ether collodion solution, prepared by removing the alcohol from U.S.P. collodion and redissolving it in ether as described in the cited Chang et al. article, the stirring being continued until the BHC is completely dissolved. The resulting solution is then used in the procedure for microencapsulation of aqueous compositions by interfacial coacervation described in the Chang et al. article. For example, urease may be incapsulated by dissolving in 5 ml. of unbuffered erythrocyte hemolysate 900 mg. of urease (Sigma type III 1720 units/gm.) and 300 mg. of tris(hydroxymethyl) aminomethane buffer, filtering, emulsifying 3 ml. of the filtrate in 30 ml. of ether, and adding 25 ml. of the ether solution of BHC-collodion to the emulsion.

Asparaginase may be incapsulated by dissolving in 5 ml. of unbuffered erythrocyte hemolysate 25 mg. of asparaginase (Worthington Biochemical Co.), filtering and emulsifying 3 ml. of the filtrate in 30 ml. of ether, and adding 25 ml. of the ether solution of BHC-collodion to the emulsion. Catalase may be incapsulated in the same way by dissolving in hemolysate and proceeding as before.

To provide microcapsules containing activated charcoal, 100 mg. of charcoal is suspended in 3 ml. of the hemolysate before encapsulation.

Microencapsulation of activated charcoal or ion-exchange resins can be effected by coating the solid particles directly with a quaternary-heparin collodion membrane.

EXAMPLE 2

Microcapsules with a nonthrombogenic surface may also be made by coating preformed microcapsules containing the desired aqueous composition with the BHC-collodion. For example, microcapsules having a hexamethylenediamimesebacoyl polyamide membrane made by the procedures described in the Chang et al. article are suspended in acetone and then transferred to water-saturated ether to which the BHC-collodion solution is added with stirring until the final concentration of BHC-collodion is 3 mg./ml. Resuspension of the treated capsules in dilute Tween 20 solution is carried out as in the cited article.

EXAMPLE 3

The polyamide microcapsules may also be rendered nonthrombogenic by suspending them in ten volumes of heparin solution (8 mg./ml.) for six hours to bring about nearly complete equilibration of heparin between the internal and external phases. The supernatant liquid is then removed by centrifuging, the microcapsules are washed for 30 seconds in distilled water and recentrifuged, and are resuspended with stirring for 20 minutes in a 10% aqueous solution of benzalkonium chloride. During this time heparin diffusing outward from the interior of the microcapsules is precipitated by contact with the benzalkonium in the membrane and permanently retained there as a benzalkonium-heparin complex. The microcapsules are then washed five times with eight volumes of water to remove free benzalkonium, then resuspended in three volumes of heparin sodium solution (8 mg./ml.), washed three times with eight volumes of water and finally resuspended in water.

EXAMPLE 4

100 ml. of heparin-benzalkonium-collodion solution prepared as described is added to 50 gms. of activated charcoal (25–50 mesh). The suspension is manually stirred until the solvent of the polymer solution has evaporated sufficiently so that the microencapsulated particles are no longer adherent to one another. The microcapsules are then spray-dried at room temperature.

Other quaternary compounds than benzalkonium, such as cetyltrimethylammonium bromide and cetyldimethylbenzylammonium chloride may be used to form the heparin complex. The quaternary compound may also be formed in the membrane or a portion thereof into a quaternary form. For example, the surfaces of polystyrene membranes of microcapsules which have been formed by the coacervation procedure is chloromethylated and then aminated, the amine group is quaternized and finally heparinized. In another procedure, the macromolecules forming the membranes of the microcapsules may comprise polymerized or copolymerized, quaternizable monomers, such as vinylpyridine, which are quaternized and heparinized after formation of the microcapsules.

Other solid materials in particulate form, such as ion-exchange resins, may be encapsulated in nonthrombogenic membranes by the method of Example 4.

Unlike the other types of microcapsules, microcapsules of the invention prevent perfusing blood from clotting and do not cause any adverse effect on the red blood cells, white blood cells and platelets of blood.

I claim:

1. Nonthrombogenic semipermeable membrane spheroidal microcapsules comprising a hydrophilic composition intended either for diffusion into the blood or reaction with blood diffusing therethrough microencapsulated in interfacially coacervated collodion or polymeric macromolecular semipermeable membranes coated with or formed in the presence of a heparin-quaternary ammonium complex, said microcapsules having membranes adapted in effective pore size for extracorporeal shunt blood perfusion therethrough without causing clotting or reduction of the blood level of erythrocytes, leucocytes or platelets of the perfused blood.

2. Spheroidal microcapsules as defined in claim 1 wherein the macromolecular membranes are formed in the presence of a benzalkonium heparin complex.

3. Spheroidal microcapsules as defined in claim 1 wherein the macromolecular membranes are coated with a benzalkonium heparin complex.

4. Spheroidal microcapsules as defined in claim 1 wherein the hydrophilic composition includes urease.

5. Spheroidal microcapsules as defined in claim 1 wherein the hydrophilic composition includes activated charcoal.

6. Nonthrombogenic semipermeable membrane spheroidal microcapsules comprising particulate solid materials intended for reaction with substances in the blood diffusing into the microcapsule microencapsulated in interfacially coacervated collodion or polymeric macromolecular semipermeable membranes coated with or formed in the presence of a heparin-quaternary ammonium complex, said microcapsules having membranes adapted in effective pore size for extracorporeal shunt blood perfusion therethrough without causing clotting or reduction of the blood level of erythrocytes, leucocytes or platelets of the perfused blood.

References Cited

UNITED STATES PATENTS

| 2,846,057 | 8/1958 | Polin | 206—.5 |
| 2,989,438 | 6/1961 | Nomine et al. | 424—183 |
| 3,063,904 | 11/1962 | Ryan | 128—214.2 |
| 3,212,498 | 10/1965 | McKirdy et al. | 128—214 |
| 3,436,452 | 4/1969 | Maierson | 264—344 |
| 3,453,194 | 7/1969 | Bennett et al. | 204—159.12 |

OTHER REFERENCES

Gott, V. L., et al.: Science, 142, 1293 (1963).

Gott, V. L., et al.: Trans. Amer. Soc. Artif. Int. Organs, 10, 213–217 (1964).

Chang, T. M. S.: Science, 146 (3643), 524–5, Oct. 23, 1964.

Change, T. M. S., et al.: Pharmacologist, 6, 198 (1964).

Chang, T. M. S.: Trans. Amer. Soc. Artif. Int. Organs, 12, 13–19 (1966).

Chang, T. M. S., et al.: Canad. Jl. of Physiol. and Pharmacol., 44 (1), 115–128 (1966).

Chang, T. M. S., et al.: Canad. Jl. of Physiol. and Pharmacol. 45 (4), 705–715 (1967).

SHEP K. ROSE, Primary Examiner

U.S. Cl. X.R.

23—258.5, 230, 259, 292; 128—172, 213, 214; 195—1.8, 103.5; 206—.5; 210—22, 321; 252—316; 264—4; 424—1, 4, 9, 10, 12, 32, 94, 101, 125, 183